United States Patent
Enz et al.

(10) Patent No.: US 10,831,650 B2
(45) Date of Patent: Nov. 10, 2020

(54) SYSTEMS AND METHODS FOR ACCESSING NON-VOLATILE MEMORY AND WRITE ACCELERATION CACHE

(71) Applicant: EXTEN Technologies, Inc., Austin, TX (US)

(72) Inventors: Michael Enz, Fargo, ND (US); Rukhsana Ansari, San Jose, CA (US); Ashwin Kamath, Cedar Park, TX (US)

(73) Assignee: EXTEN Technologies, Inc., Austin, TX (US)

( * ) Notice: Subject to any disclaimer, the term of this patent is extended or adjusted under 35 U.S.C. 154(b) by 0 days.

(21) Appl. No.: 16/294,028

(22) Filed: Mar. 6, 2019

(65) Prior Publication Data
US 2019/0278701 A1 Sep. 12, 2019

Related U.S. Application Data

(60) Provisional application No. 62/639,963, filed on Mar. 7, 2018.

(51) Int. Cl.
*G06F 12/02* (2006.01)
*G06F 12/0891* (2016.01)
*G06F 3/06* (2006.01)

(52) U.S. Cl.
CPC .......... *G06F 12/023* (2013.01); *G06F 3/0604* (2013.01); *G06F 3/0631* (2013.01); *G06F 3/0679* (2013.01); *G06F 12/0891* (2013.01)

(58) Field of Classification Search
CPC .. G06F 12/023; G06F 12/0891; G06F 3/0604; G06F 3/0631; G06F 3/0679
See application file for complete search history.

(56) References Cited

U.S. PATENT DOCUMENTS

| | | | | |
|---|---|---|---|---|
| 2014/0040552 A1* | 2/2014 | Rychlik | ............... | G06F 12/0815 711/122 |
| 2014/0379992 A1* | 12/2014 | Dey | .................... | G06F 12/0808 711/135 |
| 2019/0042151 A1* | 2/2019 | Yang | ..................... | G06F 3/0659 |
| 2019/0196716 A1* | 6/2019 | Xiao | ....................... | G06F 3/064 |

* cited by examiner

*Primary Examiner* — Kevin Verbrugge
(74) *Attorney, Agent, or Firm* — Sprinkle IP Law Group

(57) ABSTRACT

Embodiment of a storage stack are disclosed whereby increased performance and other technical improvements are achieved by an application requesting access (e.g., asynchronously) to an address, returning a buffer, and the application issuing a buffer release when the operation is complete.

21 Claims, 8 Drawing Sheets

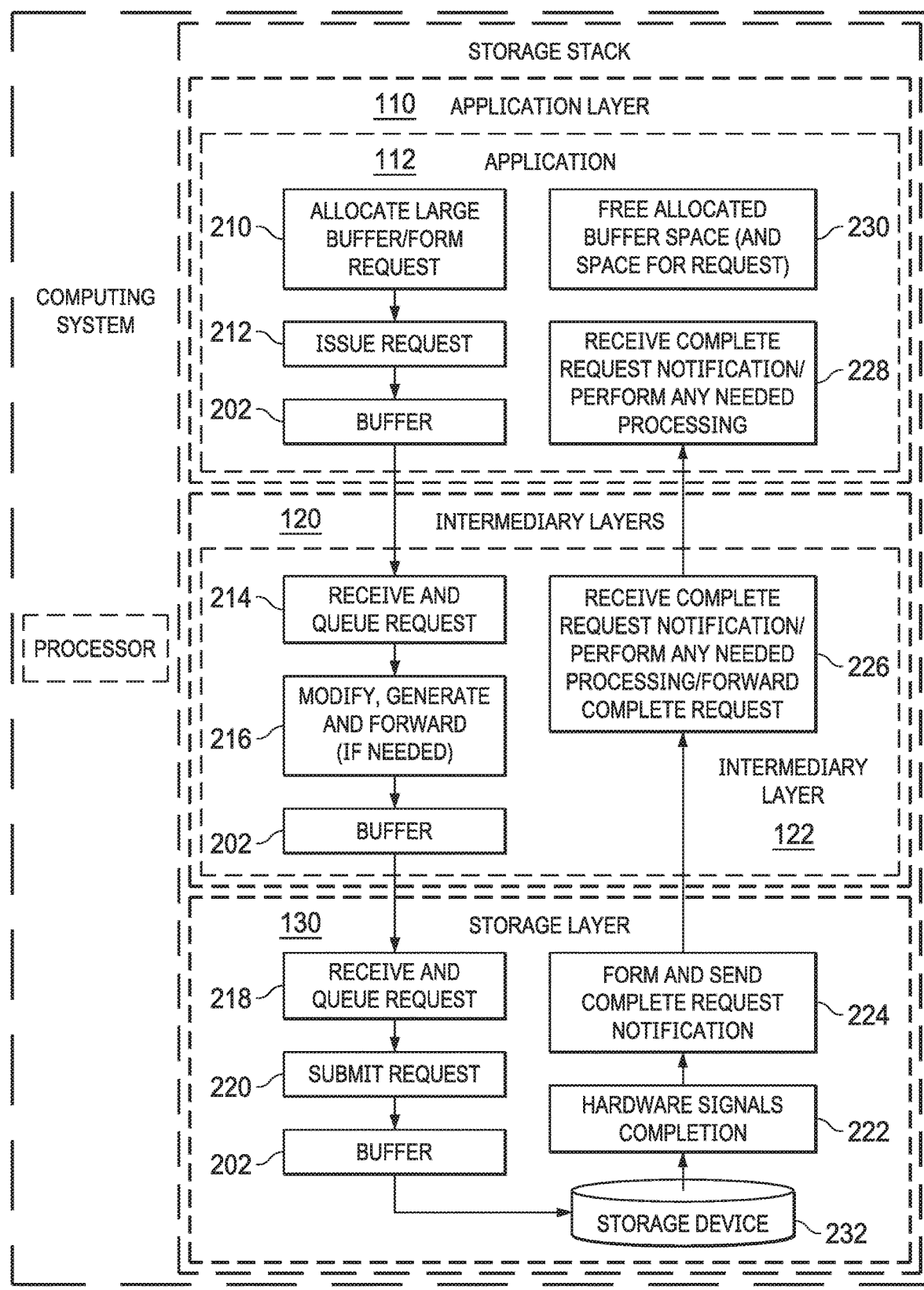

SYSTEMS AND METHODS FOR ACCESSING NON-VOLATILE MEMORY AND WRITE ACCELERATION CACHE

RELATED APPLICATIONS

This application claims a benefit of priority to the filing date of U.S. Provisional Patent Application Ser. No. 62/639,963 by Enz et al, entitled "Optimal NV-DIMM Access and Write Acceleration Cache" filed on Mar. 7, 2018, which is fully incorporated herein by reference for all purposes.

TECHNICAL FIELD

The present disclosure relates generally to computer storage systems. In particular, embodiments of the present disclosure relate to optimizing the performance of accesses to non-volatile memory. Even more specifically, embodiments of the present disclosure relate to uses of this optimized accesses in a storage system, or aspects thereof, including caching, Redundant Array of Disks (RAID) and Direct Memory Access (DMA).

BACKGROUND

Typical storage stacks in computing devices using a memory hierarchy comprised of volatile memory (VM) and non-volatile memory (NVM). UM is a type of computer storage that only maintains its data while the device is powered. UM is typically used for Random Access Memory (RAM). In contrast, NVM is a type of computer memory that has the capability to hold saved data even if the power is turned off (i.e., it is powerfail safe). Unlike volatile memory, NUM does not require its memory data to be periodically refreshed. It is commonly used for secondary storage or long-term consistent storage. Thus, a typical storage stack is arranged as a hierarchy with the faster memory such as cache or RAM arranged near the "top" of the hierarchy and relatively slower memory such as NUM comprising secondary storage arranged near the "bottom" the stack.

Accordingly, in computer systems using these traditional stacks, applications allocate a buffer near the top of the stack for a read or write. The application then performs operations or determinations with respect to this buffer. When it is desired to store this data in the secondary storage, the application may issue a storage request for a read or a write. To complete this read or write the buffer containing the data must be passed down through multiple layers of the stack until it reaches the storage device whereupon it can be stored in the secondary storage and is powerfail safe.

Increasingly, however with the advent of other NVM storage technologies, such as NV-DIMM, these NVM are being used to provide storage at different levels of the storage stack, including replacing traditional RAM or secondary storage. In many cases, these new NVM storage technologies are memory-addressable (e.g., byte addressable). However, traditional storage stack architecture does not take advantage of the myriad benefits of these new NVM storage technologies, at least because these traditional storage stacks utilize a separate buffer that must be passed through the layers of the storage stack and require a copy of the data in the buffer into the NVM memory.

What is desired then is an architecture and implementation of a storage stack for computing systems that takes full advantage of persistent storage memory architectures while remaining compatible with traditional storage hierarchies.

SUMMARY

To that end, among others, embodiments herein may utilize a storage stack that allocates buffer space for an application at the storage device layer of the storage stack (e.g., in the storage device itself). Such a storage device may be a drive (e.g., disk drive or SSD), a storage device used for a volatile cache (e.g., RAM cache) or an NVM such as NV-DIMM or the like. These embodiments may utilize an access and release operation. An access request may be issued by an application and passed through any intermediary layers of the storage stack to the storage layer of the storage stack. The storage layer may access the storage device to obtain an address of a buffer suitable to meet the access request. The address can then be returned through the intermediary layers to the application that issued the access request. The application can then use the memory at this address in the storage device for processing, by reading data from this address or writing data to this location in the storage device itself directly from the application. When the application no longer has need for the buffer (the memory location associated with the address), the application may form and issue a release request. The release request can then be forwarded by the intermediary layers to the storage layer which can release the buffer (e.g., which may be no action in the case of access read).

Embodiments may therefore utilize a storage stack that has been configured to better take advantage of particular types of storage devices, such as memory addressable storage devices, including NV-DIMMs, 3D XPoint DIMM technology, RAM storage caches or others, but which may still be utilized with other types of storage devices such as a disk or the like. These storage devices may be accessed with memory read or write instructions from a processor. That access mechanism may be a synchronous (or asynchronous) process that is low latency, unlike traditional SSDs that require an asynchronous I/O with a polled or interrupt driven completion. Moreover, the application may read or write with almost any size granularity, with any sequence of operations desired, as the reads and writes are being accomplished with respect to a buffer location in the storage device itself.

In one embodiment, a system including one embodiment of a storage stack may include a computer device having a processor, a storage device where the storage stack comprises an application layer including an application executing on the processor and a storage layer for accessing the storage device. The application forms an access request by allocating space for the access request and including a sector address and length in the access request. The application then issues the access request to the storage layer. The storage layer receives the access request and, based on the access request, including the sector address and length of the access request, determines an address of a buffer in the storage device. The storage layer completes the access request by including the address of the buffer in the storage device in the access request and returning the access request to the application.

In this embodiment, the application writes data directly to, or reads data directly from, the buffer in the storage device using the address returned in the access request. The application then forms and issues a release request to the storage layer including the address of the buffer. The storage layer receives the release request and releases the buffer. The storage layer completes the release request by nulling the address of the buffer in the release request and returns the completed release request to the application. The application, upon receiving the release request, frees the space allocated for the access request.

In a particular embodiment, the storage device is a NV-DIMM and determining the address of the buffer comprises determining an NV-DIMM address associated with the sector address. Completing the release request by the storage layer may comprise flushing a cache when the access request is a write access request.

In another embodiment, the storage device is a RAM cache and determining the address of the buffer comprises determining a RAM address in the RAM cache associated with the sector address if the sector address is cached and otherwise allocating the buffer in the RAM cache, issuing a read request to an underlying disk drive, and incrementing a reference count on the buffer. Here, completing the release request may comprise decrementing the reference count on the buffer in the RAM cache and freeing the buffer if the reference count is zero.

In still another embodiment, the storage device is a disk drive and determining the address of the buffer comprises allocating the buffer, issuing a read request to the disk drive and, upon completion of the read request, including the address of the buffer in the access request. In this instance, completing the release request may comprise freeing the allocated buffer in the disk drive.

Embodiment may therefore include a metadata based recovery technique and algorithm which provides a native, high-performance, power-fail safe write acceleration cache solution for NV-RAMs, by leveraging the byte-addressable, direct-access mode of the NV-RAM. One embodiment may use a non-volatile storage device that is directly accessible with a memory mapped address range. This may be an NV-DIMM or 3DxPoint memory DIMM.

In one embodiment, to offset the computational overhead of the parity calculation for (e.g., software RAID5) a write-acceleration cache, based on a non-volatile RAM device, may be used. Full data stripes are accumulated in the cache, designated as a cache row, parity is computed when a full cache row is composed, followed by flushing the full stripes to the underlying storage. A high-performant byte addressable, direct-access mode may be used for fast access to the non-volatile RAM device. Metadata may be added and the combined data and metadata block automatically written using the direct-access semantics to enable a consistent recovery of data in the event of a power failure during writes. Embodiments may also include metadata logic for invalidating a cache row after the data has been successfully flushed to the underlying drives, to aid in the determination of valid data in the recovery process.

Another embodiment may extend the user data write to include a small amount of metadata defining the age of the data. Matching age metadata indicate which writes are valid within a region, such as which sectors are updated in a RAID stripe. Older writes may no longer applicable to the powerfail recovery process, as they have been flushed to a backing drive. This process of extending to sector size for tracking updates and ensuring the atomicity of sector data provides a minimal impact to typical runtime performance while ensuring consistent recovery after a powerfail event.

In one particular embodiment applicable to NV-DIMM, there a power-fail safe, metadata based recovery for byte-addressable, direct-access Non-Volatile RAM based write acceleration cache used in, for example, software RAID5 is disclosed. This application is applicable to, for example, Software RAID and Non-Volatile RAM (NV-DIMM, 3DxPoint memory DIMM).

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 2 is a block diagram of a computing systems comprising a storage stack.

DETAILED DESCRIPTION

Figure 1A:
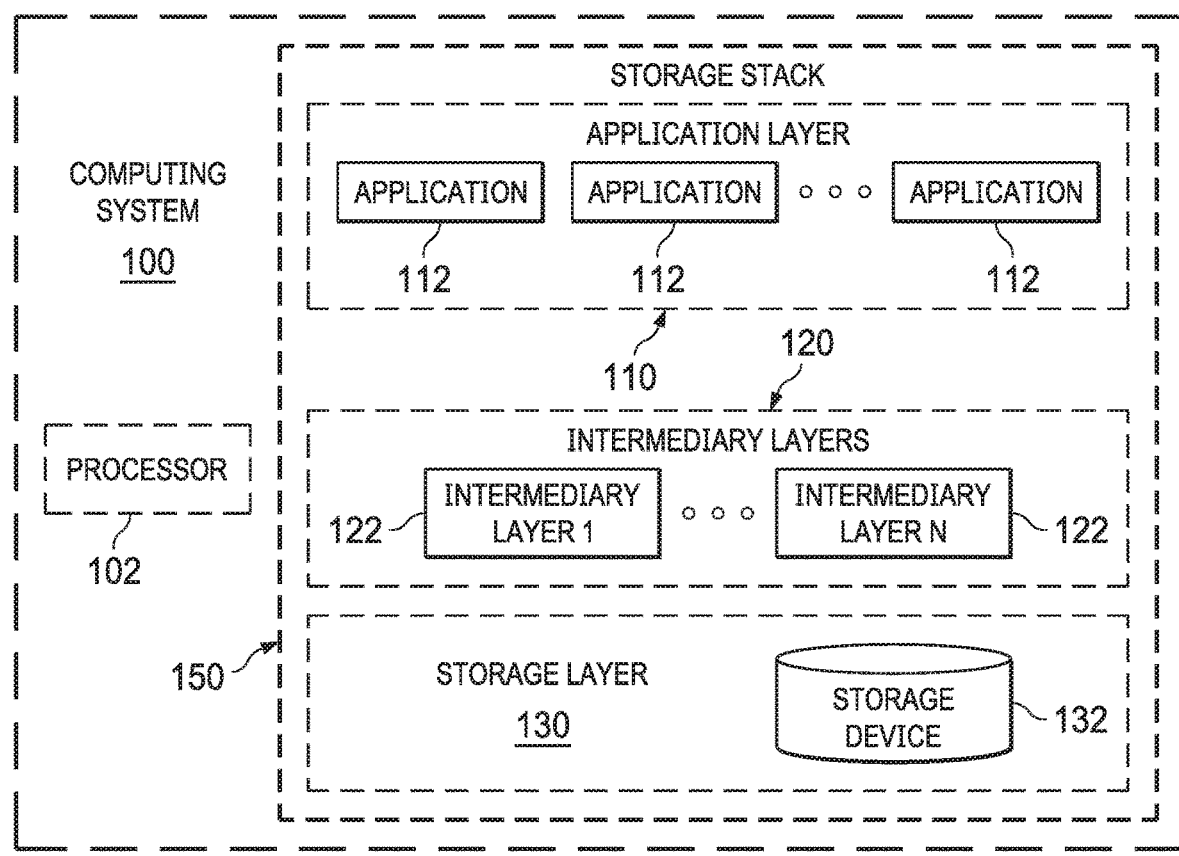
FIGS. 1A and 1B are block diagrams that include computing systems comprising a storage stack.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing specific embodiments, some context may be useful. As discussed, memory addressable storage technologies, such as certain types of NVM including NV- Dual In-Line Memory Module (DIMM), are not well-suited for typical storage stacks (e.g., asynchronous I/O storage stacks as used in typical computing systems). In the traditional storage stacks, applications allocate a buffer at the top of the stack for a read or write operation. Data for the read or write operation is then stored in the buffer. The buffer is passed down through multiple layers in the storage stack along with the request for the read or write until buffer reaches the storage device. This operational model defeats many benefits that NV-DIMM offers, by requiring a data copy from the buffer to the device.

What is desired then is an architecture and implementation of a storage stack for computing systems that takes full advantage of persistent storage memory architectures while remaining compatible with traditional storage hierarchies.

Attention is thus directed to embodiments of storage stacks for computing systems as disclosed herein. According to embodiments, buffer space may be allocated for an application at the storage device layer of the storage stack (e.g., in the storage device (e.g., NVM such as NV-DIMM or 3DxPoint memory DIMM) itself). These embodiments may utilize an access and release operation (e.g., in lieu or in addition to a write or read operation). An access request may be issued by an application by allocating space for the request and forming the request. The request can be passed through any intermediary layers of the storage stack to the storage layer of the storage stack. The storage layer may access a storage device to obtain an address of a region of memory (referred to herein as a buffer) suitable to meet the access request. This address may be an address to a memory in the storage device of a requested size to use as the buffer (e.g., in the case of an access request for a write) or a location of requested data in the storage device (e.g., in the case of access request for a read).

The address can then be returned through the intermediary layers to the application that issued the access request. The application can then use the memory at this address in the storage device for processing, by reading data from this address or writing data to this location directly from the application. When the application no longer has need for the buffer (the memory location associated with the address), the application may form and issue a release request. The release request can then be forwarded by the intermediary layers to the storage layer which can release the buffer (e.g., which may be no action in the case of access read). The release request can then be completed by the storage layer (e.g., a flag set indicating the release has been accomplished) and the release returned to the issuing application, which may, in turn, free any memory utilized for the initial access request.

In this manner, applications may directly utilize a buffer in the storage device for their processing, eliminating the need for creation of a buffer in another memory location (e.g., cache or volatile memory) that may need to be passed through the layers of a storage hierarchy and copied. Accordingly, embodiments may substantially optimize the performance of storage stacks that utilize NVM storage devices including storage devices that are directly accessible with a memory mapped address range such as types of a NV-DIMM or 3DxPoint memory DIMM. Additionally, embodiments of systems employing such a storage stack may optimize RAM caches in the storage stack (e.g., that may act as a memory mapped storage destination). In certain embodiments, both the access and release operations may be done asynchronously to allow embodiments to work with any type of storage device, whether it is directly memory mapped or requires asynchronous block storage access.

Consequently, embodiments of such a storage stack as disclosed may be utilized with any type of storage device including traditional disk drive or solid state disk (SSD), volatile cache or NVM such as NV-DIMM, while providing essentially optimized zero copy behavior for these newly emerging NVM storage devices.

Moreover, because the buffers utilized by the application may be in the NVM itself, such data may be powerfail safe as soon as it is written by the application, increasing the fault tolerance of embodiments of computing systems that employ such a storage stack. In certain embodiments, both the access and release operations may be done asynchronously to allow embodiments to work with any type of storage device, whether it is directly memory mapped or requires asynchronous block storage access. Certain embodiments may also minimize the duration of buffer allocation by delaying the initiation of an access request to the last possible time during the storage access by an application.

Accordingly, embodiments may prove useful in a variety of contexts, including in caching of receive requests or metadata in a storage system, such as an Non-Volatile Memory Express (NVMe or NVME) or fabrics storage target or the like.

It may now be useful to describing embodiments to discuss a storage stack. FIG. 1A depicts a storage stack 150 of a computing system 100 including a processor 102. The storage stack 150 includes an application layer 110, zero or more intermediary layers 120 and a storage layer 130. Applications 112 execute in the application layer 110 and may issue storage requests. These storage requests may be processed, altered or supplemented by the one or more intermediary layers 122. For example, an intermediary layer 122 may include a layer 122 implementing a Redundant Array of Independent Disks (RAID) layer that may alter the incoming storage request or form one or more storage requests based on the incoming storage requests. These storage requests may serve to read, write or otherwise access data in a storage device 132 in storage layer 130. Thus, each layer 110, 120, 130 may be responsible for a different aspect of the storage process, for example from transforming data to encoding redundancy information. Thought of as a hierarchy, at the top of the stack is an application 112 that needs to read or write data and the bottom is a physical storage device 132, such as a solid state drive (SSD).

Figure 1B:
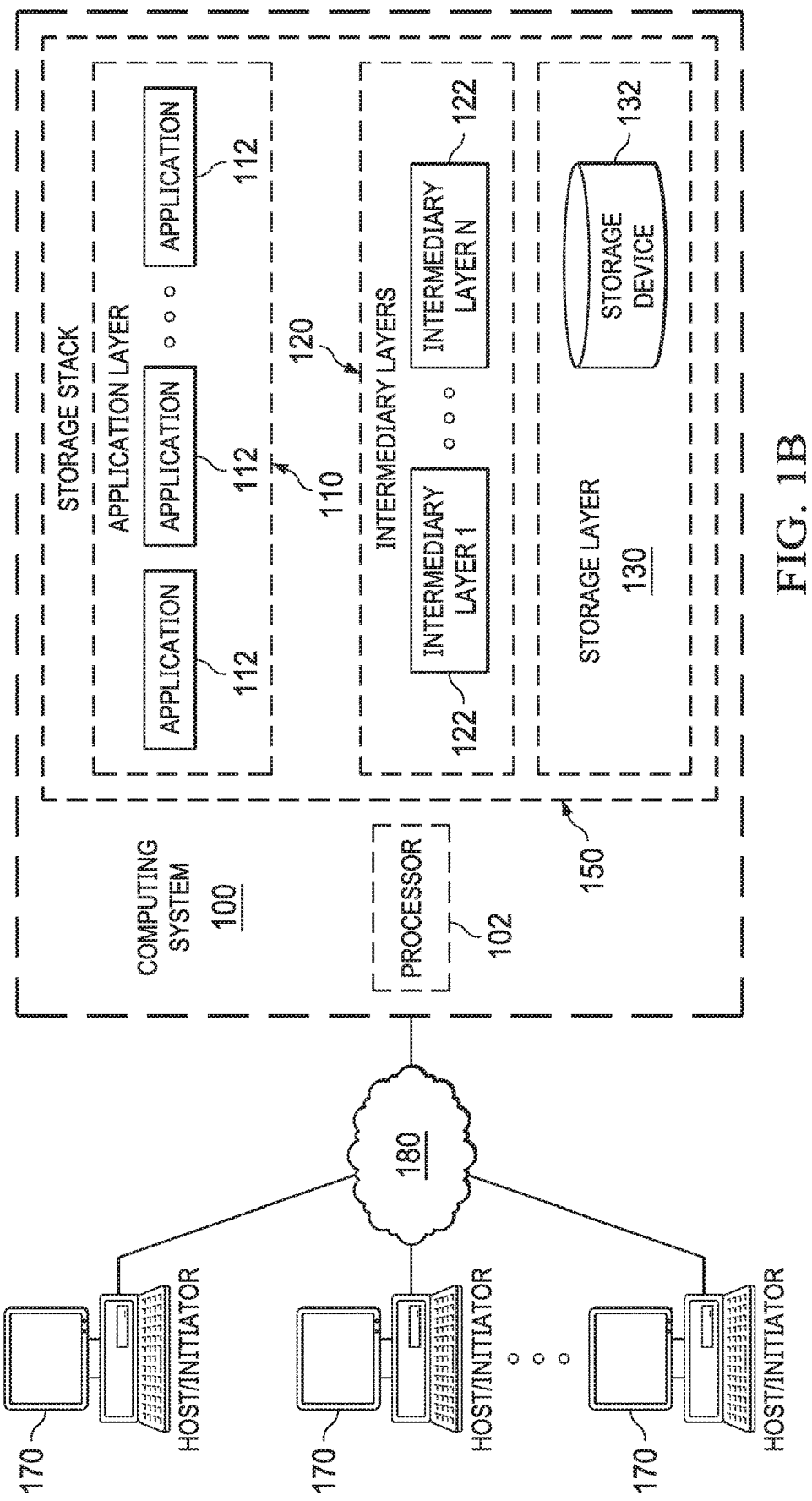

Referring to FIG. 1B, storage stacks may be used for example, in a computing system 100 serving as a storage servers, target or intermediaries of a storage system that services storage requests from hosts or initiators 170 over a network 180. Specifically, the host/initiator 170 may issue storage requests to the computing system 100, where an application 112 may queue the request from the host/initiator 170, implement the received request with respect to the storage device 132 at the computing system 100.

Moving to FIG. 2, a block diagram illustrating the operation of a storage stack is depicted. As discussed, for a storage request (e.g., read or write) certain storage stacks may require the top level to allocate a buffer and send that I/O request down the stack. Such a request complete asynchronously when the I/O operation is done. The completion (e.g., notification) will traverse up the stack to the issuing application. The application will then free the allocated buffer.

Thus, for example, as shown in FIG. 2, application 112 may allocate a buffer 202 (step 210) for an access request and issue that storage request (step 212). The request and the associated buffer 202 may be received (step 214) at any intermediary layer 122 (e.g., such as a RAID layer). The intermediary layer may modify or generate additional requests, if needed, and forward the request and the buffer 202 (step 216). The storage layer 130 may receive the request and buffer (step 218) and submit the request to the storage device 232 (step 220). This request may entail copying of the data of the buffer 202 into the storage device 232.

When the storage device 232 or other storage hardware signals that the request has been completed (e.g., the copy has finished) (step 222), the complete request notification may be formed by the storage layer 130 (step 224). This completed request notification maybe received by the any intermediary layers 122 which may perform and needed processing and forward the complete request notification to the requesting application (step 226). The issuing application 112 may receive the complete notification, perform any need processing (step 228) and free the buffer 202 (and any space allocated for the I/O request) (step 230).

Thus, notice here that the buffer 202 is allocated by the requesting application separately from the storage device 132 and must be passed down from the application 112 through the intermediary layers 122 to the storage layer 130. The storage layer is thus required to copy the data form the buffer 202 into the storage device 132 (e.g., to complete a write request). Note as well that the allocation of the data buffer 202 may be unnecessary for the receiving and queuing of the request by the intermediary layer 122 or storage layer 130 (steps 214, 218). These steps may, for example, be long duration steps if the storage stack has a large queue of pending work.

Moreover, such an implementation may be problematic in cases where such a storage stack is implemented in a storage server in a networked storage system such as an NVMe over fabrics storage server, as large buffers may have to be allocated for read or write requests received over a network from a host or initiator and these buffers filled, copied and passed between layers on the storage server.

Accordingly, embodiments herein may utilize a storage stack that allocates buffer space for an application at the storage device layer of the storage stack (e.g., in the storage device itself). Such a storage device may be a drive (e.g., disk drive or SSD), a storage device used for a volatile cache (e.g., RAM cache) or an NVM such as NV-DIMM or the like. These embodiments may utilize an access and release operation. An access request may be issued by an application and passed through any intermediary layers of the storage stack to the storage layer of the storage stack. The storage layer may access the storage device to obtain an address of a buffer suitable to meet the access request, or the software at the storage layer may manage buffer allocation for the storage device. The address can then be returned through the intermediary layers to the application that issued the access request. The application can then use the memory at this address in the storage device for processing, by reading data from this address or writing data to this location in the storage device itself directly from the application. When the application no longer has need for the buffer (the memory location associated with the address), the application may form and issue a release request. The release request can then be forwarded by the intermediary layers to the storage layer which can release the buffer (e.g., which may be no action in the case of access read).

Embodiments may therefore utilize a storage stack that has been configured to better take advantage of particular types of storage devices, such as memory addressable storage devices, including NV-DIMMs, 3D XPoint DIMM technology, RAM storage caches or others, but which may still be utilized with other types of storage devices such as a disk or the like. These storage devices may be accessed with memory read or write instructions from a processor. That access mechanism may be a synchronous (or asynchronous) process that is low latency, unlike traditional SSDs that require an asynchronous I/O with a polled or interrupt driven completion.

According to embodiments of such a storage stack therefore, I/O requests from an application may start as a small descriptor (or request) without a buffer for the storage data. The access request is issued from the top of the stack (e.g., the application). The access request passes down the stack and the bottom layer (e.g., storage layer) determines a buffer memory address in the storage device and adds the buffer memory address to the request to allow direct read or write access to the memory. The access request completes to the issuing application with the buffer address, and the application performs desired reads or writes of data to the buffer (e.g., using processor instructions).

The application may read or write with almost any size granularity, with any sequence of operations desired, as the reads and writes are being accomplished with respect to a buffer location in the storage device itself. When the application finishes the request, it submits an access release (or just release) request down the stack. This release request may indicate if the buffer was modified or not, allowing the bottom layer (storage device layer) to perform any appropriate action to secure the data such as a cache flush or the like. For example, in some cases, the storage layer may take no action, while in other embodiments when a release request indicates that a buffer was modified the storage layer may issue a CPU cache flush or fence, or a RAM cache writeback operation. Once the access release operation completes up the storage stack to the application, the data I/O is finished and the access request (e.g., the memory used for the access request) may be freed by the issuing application.

Figure 3:
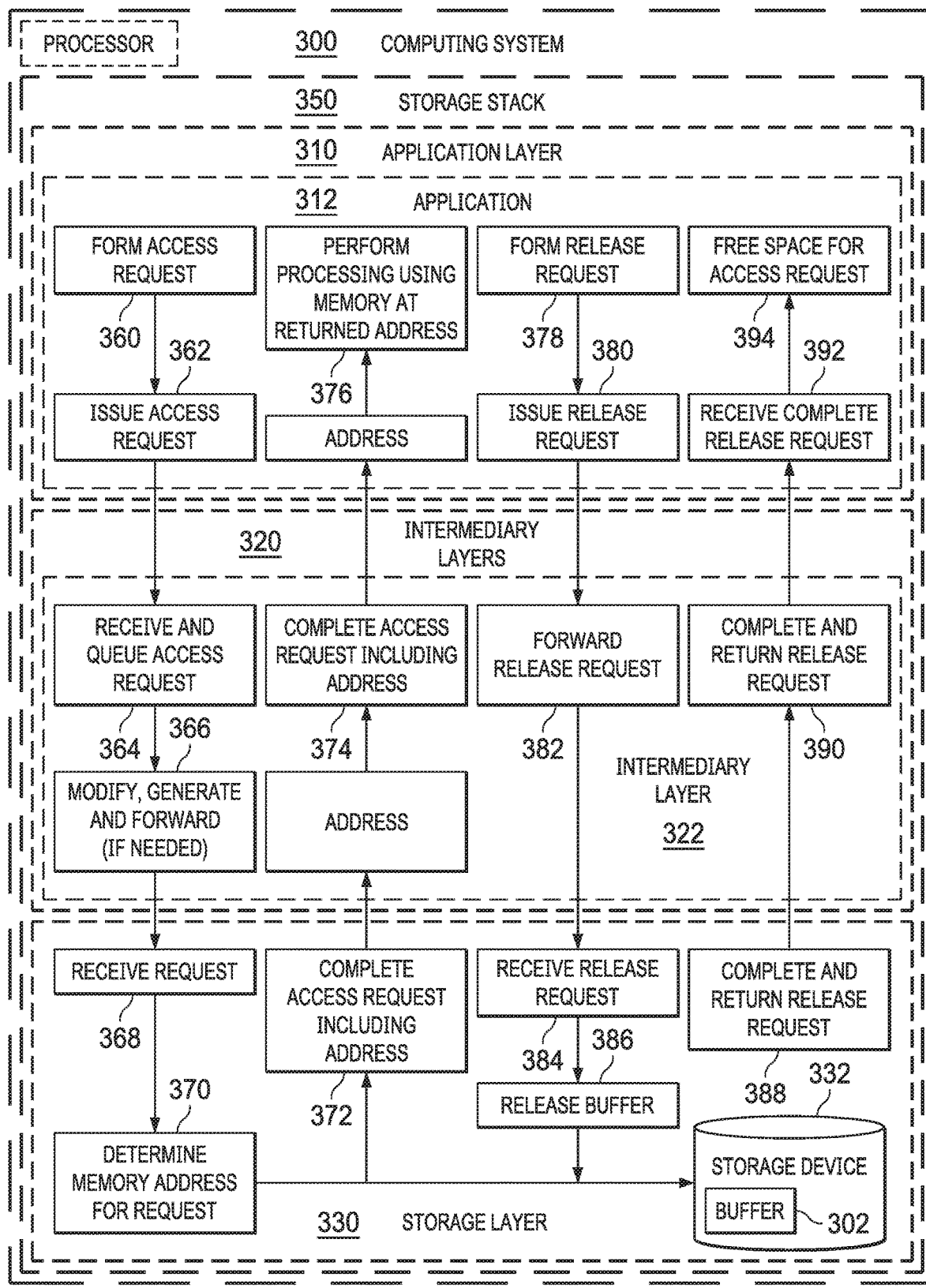
FIG. 3 is a block diagram of one embodiment of a computing system including an embodiment of a storage stack.

FIG. 3 is a block diagram depicting one embodiment of a computing system 300 employing a storage stack 350 that allocates buffer space in a storage device 332 at a storage layer 330. Specifically, the storage stack 350 includes an application layer 310, zero or more intermediary layers 320 and a storage layer 330 for accessing a storage device 332 such as memory mapped storage device like a NV-DIMM or the like. This storage device 332 may, for example, serve as the Random Access Memory (RAM) or volatile cache utilized by the executing applications 312 on the computing system 300.

Applications 312 execute in the application layer 310 and may issue storage requests. Specifically, in one embodiment, application 312 may form an access request (step 360) by allocating space for the request and forming the request. This access request may be an NVMe command, where the command may specify, for example, whether it is a read or write, if a read what the address is, and the length of the data. Such a request may therefore be relatively small, on the order of 64 bytes of the like. The application 310 can then issue the access request (step 362). The access request may be a "read" access request or a "write" access request, and may utilize a special opcode that takes the form of the following, along with the a corresponding return, release request and descriptor stack:

```
enum opcode_t {
    undefined = 0,
    read = 1,        // DMA read access.
```

```
    write = 2,        // DMA write access.
    read_access = 3,  // zero copy read access.
    write_access = 4, // zero copy write access.
    read_release = 5, // release of previous read access
    write_release = 6, // release of previous write access
};
enum extent_flags_t : uint32_t {
    none = 0,
    buffer_access_trim = 32, // hint for writing all zeros
};
// Stack pushed onto the context for one IO to provide the relevant opcode
struct read_write_access_t {
    op_code_t opcode;
    uint64_t address = 0;
    uint32_t length= 1;
    extent_flags_t flags = none;
};
```

Accordingly, in one embodiment, a command context object containing a stack and a memory pointer for the data can be allocated. The memory pointer is initially null. Then, the read_write_access_t frame can be pushed on the context's stack. The frame includes the sector address or volume address, length, and optional flags to inform lower layers of an intent. Following this, a method such as read_access_async can be called on the lower object in storage stack.

The access request can be passed through any intermediary layers of the storage stack to the storage layer of the storage stack. An intermediary layer 322, such as a RAID application or the like, may receive and queue the access request for processing (step 364). Thus, the intermediary layer 322 may modify or generate additional requests, if needed, and forward the access request (step 366). For example, the address of volume may be remapped to the correct underlying drive in a RAID set, and another iframe_extent_access_t frame pushed on the I/O context stack with the new drive address.

The storage layer 330 may receive the access request (step 368) and (e.g., the case of a write access request) access the storage device 332 to determine a memory address for a buffer 302 to satisfy the request (step 370). For example, this address may be an address to a memory in the storage device of a requested size to use as the buffer 302 (e.g., in the case of an access request for a write) or a location of requested data in the storage device (e.g., in the case of access request for a read). In some embodiments, the storage layer 330 may lock the buffer 302 with respect to the storage device such that the memory location at the address may not be written by another process or application at this point.

In one embodiment, the storage layer 330 may determine the address based on a type of the storage device. With reference to the example opcodes and formats above, if the storage device is a NV-DIMM, the storage layer 330 may assign the NV-DIMM address of the requested data to the command object. If the storage device 332 is a drive, the storage layer 330 may allocate a buffer 302 and issue a read to the underlying drive. Upon completion, the storage layer 330 may assign the buffer's address to the original request. If the storage device 332 is a RAM Cache and if the address of the request is cached, the storage layer 330 can assign the RAM address to the command object immediately. Otherwise, the storage layer 330 may fill the cache first by allocating a buffer and issuing a read request to the underlying drive to assign the buffer's address to the original request. The storage layer 330 can then increment a reference count on this buffer in the cache to avoid freeing the buffer until the access is done.

Once the address is determined, the address can then be returned through the intermediary layers to the application that issued the access request. Specifically, the storage layer 330 may include or populate the address of the buffer 302 in the received access request and return the completed access request (step 372) (referred to as "completing" the access request). In one embodiment, the storage layer 330 may call a callback function on the request context when completing the access request. The intermediary layer 322 can receive the completed access request, including the address, and return the completed access request to the application 312 (step 374). In one embodiment, this completion may include the intermediary layer 322 popping the drive frame that the intermediary layer 322 pushed on the I/O context stack (e.g., in step 366). The application 312 can then use the buffer 302 at the address in the storage device 332 returned in the completed access request during processing, by reading data from this buffer 302 or writing data to this buffer 302 directly from the application 312 (step 376). For example, the application 312 may access any portion of the data buffer provided in the completed access request, which may often involve only reading a few bytes in a larger (e.g., 4 KB) buffer 302.

As the application can "work" out of the buffer 302 specified by the address, the application may have no need to allocate a separate storage location in other memory of the computing device 300 in which to do processing or calculation. Specifically, as the application 312 can generate desired data once the buffer 302 is obtained and store the data in that buffer 302, no sperate memory location or storage is needed. Moreover, as the application can directly read or write data in the buffer 302 in the storage device 332 (which may be a memory mapped or byte addressable storage device), the application only needs to read (or write) the portion of the data that the application 312 needs without having to copy over the entire addressable data space. For example, while the data could be read or accessed in 4 k blocks, the application 312 may only be interested in a few bytes of data and may only need to read or write those few bytes.

When the application 312 no longer has need for the buffer 302 (the memory location associated with the address), the application 312 may form and issue a release request (steps 378, 380). This release request may utilize a separate opcode from the access request as discussed above. Accordingly, in one embodiment, the application 312 may push a frame with the remapped address (e.g., similar to steps 364 and 366). The application 312 then call read_release_async on the lower object in storage stack.

The release request can then be forwarded by the intermediary layer 322 (step 382) to the storage layer 330. This forwarding may also involve calling read_release_async on the lower object in the storage stack. The storage layer 330 received the release request (step 384) and releases the buffer 302 (step 386). Such a release may entail no action in the case where the access request was an access read request or may entail, for example, freeing up a line in cache or setting an indication that the buffer 302 can be freed.

In one embodiment, the release of the buffer 302 may include issuing one or more processor instructions flush any associated lines of cache in the computer system 300 to ensure that the line of cache is flushed to the storage device 332. Specifically, a processor instruction may be issued to flush a line of cache associated with the address of the buffer 302 (e.g., the same address that was retuned in the access request). For example, certain processor architectures such as Intel or AMD based architectures may offer cache flush instructions or snoop instructions that allow for flushing of a cache line (e.g., 64 bits). In this case, the storage layer 330 may determine from the address of the access request the (e.g., 64 bit lines) that are associated with the buffer and issue flush instructions for each of the associated cache lines.

The release may also be handled by the storage layer 330 based on the type of the storage device 332. For example if the storage device 332 is an NV-DIMM and the original access request was a reads no action may be required, while if the access request was a write, the storage layer 330 may flush the cache to persist the data in NV-DIMM, ensuring the data is secure in the case of any power failure as discussed. If the storage device 332 is a drive, the storage layer may just free the allocated buffer. And, if the storage device 332 is a RAM cache, the storage layer 330 may reduce a reference count on the buffer in the cache. If or when the reference drops to zero the buffer may be freed at any time after.

The release request can then be completed by the storage layer (e.g., a flag set in the release request indicating the release has been accomplished) and the release returned to the issuing application 312 (step 388). In one embodiment, this may involve nulling the pointer in the command context. The intermediary layer 322 can receive the completed release request and return the completed release request to the application 312 (step 390). Again, this may involve popping the frame that was pushed on the I/O context stack. The application 312 may, in turn, receive the completed release request (step 392) and free any memory utilized for the initial access request (step 394).

Note with respect to the depicted embodiments that these steps may be performed on a per request basis. Thus, each access request may get a corresponding release, where that release may only apply to the buffer accessed or provisioned for that request. Accordingly, embodiment may be may increase performance of memory access, as the storage device may be much larger than the addressable memory. By doing an access request, a window to access (e.g., write) into that memory of the storage device may be obtained and then effectively released.

Therefore, according to embodiments, a large data buffer may never need be allocated (e.g., by the application 312) because the address of the data can be written into the access request that is returned and accessed directly by the application. Furthermore, such a storage stack may optimized. For example, embodiments of a storage stack may not need to involve any intermediary layers 322 in the release operations for the buffer (e.g., steps 382 and 390 may be eliminated), further speeding the operation of such a storage stack.

Other optimizations are possible, for example, embodiments of a storage stack may utilize an access request that has a "hint" field. Where the data or values in the hint filed may describe or be associated with an intended modification to the storage data. For example, a "read" hint in this field may indicate that the data will not be modified, and the storage layer may use that knowledge to provide an optimization such as using a common buffer filled with zeros if it knows that the desired address provided in the request has never been written (e.g., a common buffer that has been zeroed out may be provided in response to all such requests in order to memorize memory accesses or locks). Similarly, a "write all zeros" hint in a field of an access request (e.g., a "trim" hint) could avoid writing zero data to a storage device and replace the operation with a sector deallocate (trim) command. For example, in this situation, underlying devices or storage layers may remove address mappings instead of writing sectors of zeroes. Alternatively, a "write all zeros" hint may be used to avoid allocating physical storage in a thinly allocated device, where the device already knows the data region is returning zeros.

These hints may thus enhance the performance for individual access or the storage stack as a whole.

Embodiments may have the added advantage that the architecture for these embodiments may easily implemented for traditional devices. For example, in computing systems employing these embodiments a user read request may be implemented with an access request as discussed above. However, if the storage device in the storage stack is a traditional drive, that storage layer may simply allocate a memory buffer to perform the I/O, and return that buffer with the access request completion. An access release will serve to free that buffer at the same level in the stack in the storage stack (e.g., at the storage layer). Accordingly, the use of embodiments of such a storage stack may reduce the duration that a buffer is allocated, as I/O is queued in various layers of the storage stack, which is beneficial to reduce the memory consumption of the system. It also allows allocating the storage layer to utilize a variety of criteria in determining a desired buffer to return in response to an access request, including an optimal buffer for the type of memory access to be performed, such as a DMA transfer to the storage device, or an optimal location of a buffer, such as when the storage device may be included on a such as on Non-Uniform Memory Access (NUMA) node.

Moreover, while embodiments the access request and release process are described with respect to FIG. 3 as asynchronous, embodiment of such a storage stack may also easily be implemented as in a synchronous manner, where the access request may, for example, return a status indication if it completes synchronously, thus avoiding the access request completion. Embodiments of such a storage stack that behave synchronously applied may be usefully utilized in computing system employing random memory access storage devices that have immediate random access available to the entire data space. The synchronous behavior works well, for example, for a RAM cache in the storage stack, where hits to the cache may return synchronously while cache misses may return an asynchronous completion.

Note as well that embodiments as described with respect to FIG. 3 may be equally useful in a storage stack within a single computing device or across a storage network. For example, the same access semantics as described may work across a storage network with Remote DMA (RDMA) support when a client (hosting the application layer of the storage stack or issuing requests to the application layer of a storage stack at a server) is physically remote from the storage device.

An access request from an issuing client would go to the server, where the server would issue an access request to obtain a data buffer. The application at the server can then map the data buffer in a RDMA memory region. The RDMA memory region is returned to the client (e.g., with the access request completion). The client is able to read or write the remote memory region with RDMA read and write commands to the address of the buffer. Finally, the release command (e.g., issued by the application at the client or at the application layer of the server) would invalidate the RDMA memory region and commit any modifications to the returned buffer. Accordingly, in such a scenario, embodiments of a storage stack with such an access and release mechanism avoids any additional buffer allocation on the server side, and offers extremely efficient random access to a remote client.

These access semantics using an access request and release for storage devices, including NV-DIMM or the like may be utilized usefully in a variety of contexts. For example, while embodiments have been described as having the access requests and releases being issue by applications in an application layer, in one embodiment, these access semantics may be employed by a RAID (or other type of storage) application that may reside at an intermediary layer of a storage stack to great efficacy in the implementation of a write acceleration cache.

To give some context, to certain embodiments, write acceleration caches are often used in software RAID implementations (e.g., RAID5 solutions) to address the performance overhead of parity computations. Specifically, byte-addressable, direct-access based NV-DIMM solutions may provide higher performant NV-DIMM access for such caches but require a power-fail safe solution for consistent writes.

For example, a journaling based, direct-access file system may be used to access the storage to address the issue of inconsistent writes, or a write hole, during a power failure. Some implementations may provide a write ahead journal, written via block I/O semantics to a generic block device. These approaches incur a higher overhead since they either rely on underlying file system support for journaling, or use traditional block-I/O semantics to access the journal-device for write operations. More efficient implementations of such write caches are needed.

Figure 4:
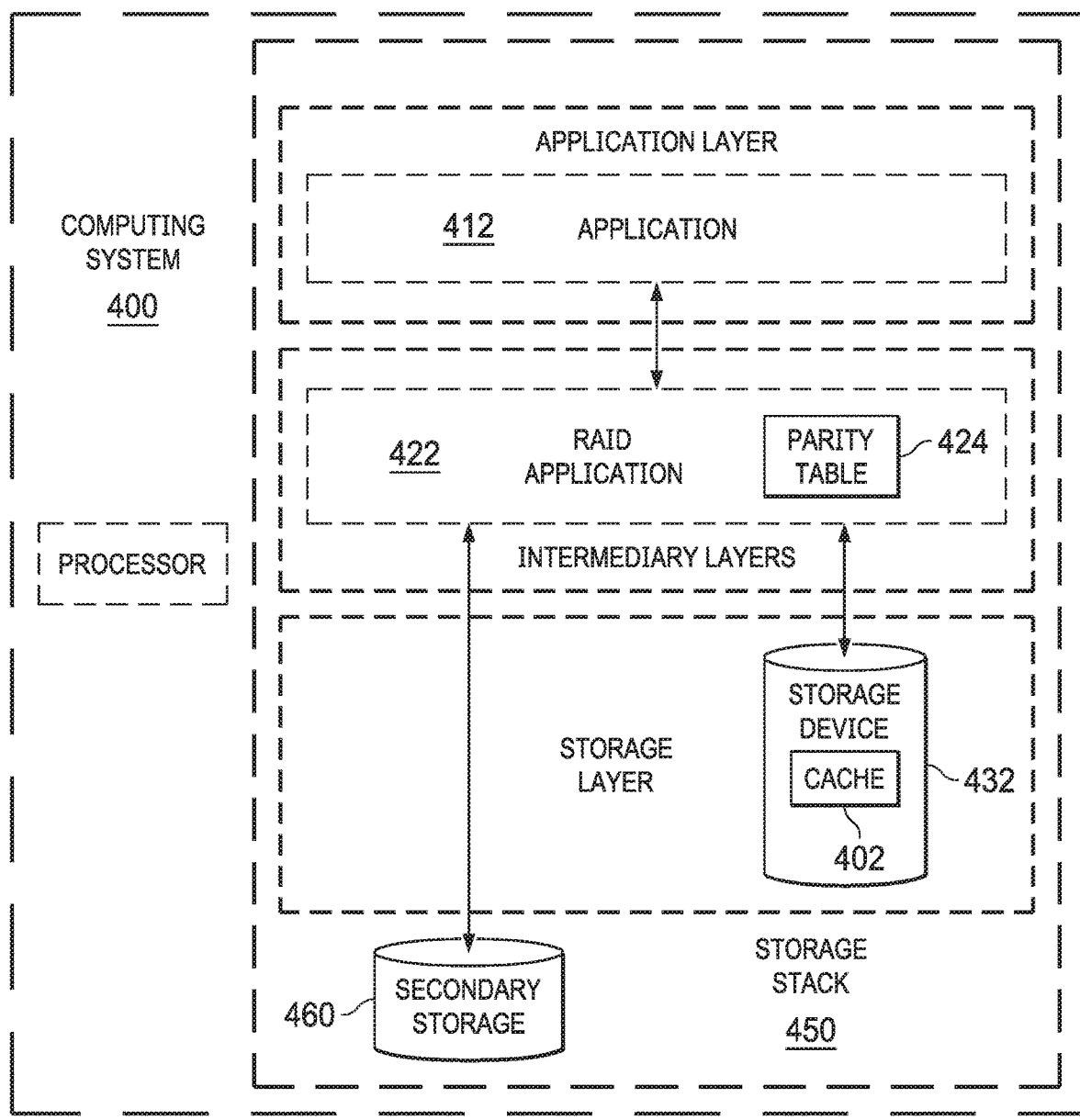
FIG. 4 is a block diagram of one embodiment of a computing system employing an embodiment of a storage stack to implement a write cache for storage applications.

FIG. 4 depicts one embodiment of a computing system 400 including a storage application, such as a RAID application 422, employing a storage stack 450 including access semantics (including an access request and release) to implement a write acceleration cache 402. The computing system 400 may include a storage device 432 functioning as RAM (e.g., Non-Volatile RAM) for the computing system and may be, for example, NV-DIMM, a 3DxPoint memory DIMM or the like. The computing system 400 may also include secondary storage 460 which may be used to hold the data (e.g., data and parity) written by the RAID application 422 such as an SSD or the like. The RAID application 422 may maintain write cache 402 in the storage device 432.

The RAID application 422 may receive write commands and associated data from an application 412 in the application layer. As is known in the art, to write the data to secondary storage the RAID application 422 may need to compute parity or other data for fault tolerance or maintenance. In one embodiment, the RAID application may utilize a parity table 424 data structure to track the write request (e.g., and data) to be written to the cache along with certain metadata that may be written, including an indication of addresses or sectors of data being modified. The RAID application 422 can thus update the parity table 424 with data regarding the received write request, including for example, a data stripe or address to be written, effected sectors, or other information. The RAID application can also add metadata to the parity table to indicate the validity of that entry in the parity table (e.g., that parity has not yet been calculated for that stripe, etc.).

The RAID application 422 can then write the write request and associated data into the write cache 402 in the storage device 432. This data can be written using the access request and release access semantics as described above, including embodiments of the byte-addressable direct access semantics. In one embodiment, the RAID application 422 may obtain an address in the cache 402 (e.g., an address of a row in the cache) from the storage layer of the storage stack 450 and DMA the data of the write request to the obtained address. When a competition of the write to the cache 402 is received from the storage layer, the RAID application may then write validity metadata to that row of the cache 402 indicating it is valid. The RAID application can then return a completion or the initially received write to the requesting application (e.g., despite that the data for the write is in the cache and not the secondary storage).

At some later point, the RAID application 422 may access the write request and data in the cache 402 (e.g., based on an entry in the party table 424) and perform any parity or other calculations based on the data of the write request. As an additional advantage, the RAID application 422 may perform Zero Copy or other consolidation of parity computations in the case where sequential I/O is being performed. Once the parity or other data is determined, this parity data and the write data may be written by the RAID application 422 out to the secondary storage 460. The metadata of the row in the cache 402 associated with that write command may then be written to mark that row of the cache as invalid.

If the power fails at some point, the validity metadata of the cache 402 may indicate which write requests have not yet been evaluated by the RAID application 422 and flushed out to the secondary storage. Thus, during a recover process, the RAID application 422 may scan each row of the cache 402. If the metadata of the cache row indicates the cache row is valid (e.g., the write request associated with that row has not been flushed out to the secondary storage) the RAID application 422 may update the parity table 424 with data from that cache row to indicate that the parity for that write has not been determined and flushed out to secondary storage. Once the last cache row of the cache 402 has been evaluated the recovery process may be complete. At this point, the RAID application 422 may (at some later point) access the write request and data in the cache 402 (e.g., based on the restored entry in the party table 424) and perform any parity or other calculations based on the data of the write request. Once the parity or other data is determined, this parity data and the write data may be written by the RAID application 422 out to the secondary storage 460. The metadata of the row in the cache 402 associated with that write command may then be written to mark that row of the cache as invalid.

Figure 5:
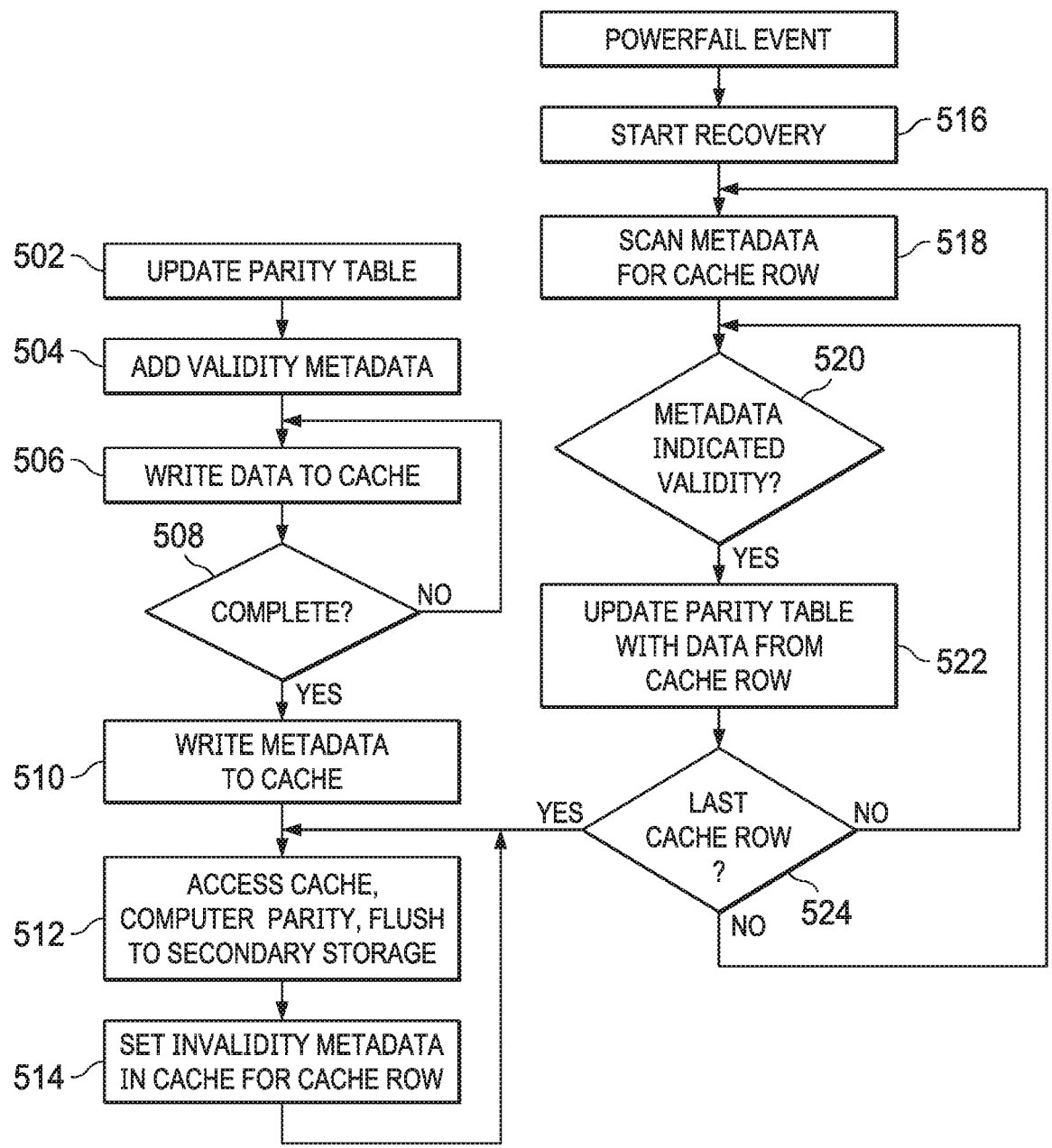
FIG. 5 is a flow diagram of one embodiment of a method for implementing a write cache using an embodiment of a storage stack.

FIG. 5 depicts a method that may be utilized by a storage application such as a RAID application, to implement a write cache. A RAID application may receive write commands and associated data from an application. The RAID application can update a table (e.g., a parity table) with data regarding the received write request, including for example, a data stripe or address to be written, effected sectors, or other information (step 502). The RAID application can also add metadata to the parity table to indicate the validity of that entry in the parity table (e.g., that parity has not yet been calculated for that stripe, etc.) (step 504).

The RAID application can then write the write request and associated data into the write cache in the NV-RAM of the computing device (step 506). This data can be written using the access request and release access semantics as described above, including embodiments of the byte-addressable direct access semantics. In one embodiment, the RAID application may obtain an address in the cache (e.g., an address of a row in the cache) from the storage layer of the storage stack and DMA the data of the write request to the obtained address.

When a competition of the write to the cache is received from the storage layer (Y branch of step 508) the RAID application may then write validity metadata to that row of the cache indicating it is valid (step 510). The RAID application can then return a completion or the initially received write to the requesting application (e.g., despite that the data for the write is in the cache and not the secondary storage).

At some later point, the RAID application may access the write request and data in the cache (e.g., based on an entry in the party table) and perform any parity or other calculations based on the data of the write request. Once the parity or other data is determined, this parity data and the write data may be written by the RAID application out to the secondary storage (step 512). The metadata of the row in the cache associated with that write command may then be written to mark that row of the cache as invalid (step 514).

If the power fails at some point, the validity metadata of the cache may indicate which write requests have not yet been evaluated by the RAID application and flushed out to the secondary storage. Thus, during a recover process (step 516), the RAID application may scan each row of the cache (step 518). If the metadata of the cache row indicates the cache row is valid (e.g., the write request associated with that row has not been flushed out to the secondary storage) (Y branch of step 520) the RAID application may update the parity table with data from that cache row to indicate that the parity for that write has not been determined and flushed out to secondary storage. Once the last cache row of the cache has been evaluated (step 524) the recovery process may be complete. At this point, the RAID application may (at some later point) access the write request and data in the cache (e.g., based on the restored entry in the party table) and perform any parity or other calculations based on the data of the write request. Once the parity or other data is determined, this parity data and the write data may be written by the RAID application out to the secondary storage (step 512). The metadata of the row in the cache associated with that write command may then be written to mark that row of the cache as invalid (step 514).

As can be seen then, according to certain embodiments, full data stripes are accumulated in the cache, designated as a cache row, parity is computed when a full cache row is composed, followed by flushing the full stripes to the underlying storage (e.g., SSD or the like). A high-performant byte addressable, direct-access mode can be used for fast access to the non-volatile RAM device. Embodiments may add metadata and may automatically write the combined data and metadata block using the direct-access semantics to enable a consistent recovery of data in the event of a power failure during writes. Embodiments may also include metadata logic for invalidating a cache row after the data has been successfully flushed to the underlying drives, to aid in the determination of valid data in the recovery process.

It will be noted that although embodiments have been described with respect to RAID and certain terminology has been used in association with RAID and particularly RAID5, other embodiments may also be effectively utilized in almost any other storage context where write caches or powerfail safe data may be desired, including, for example, other storage applications, including RAID implementations such as RAID1 and RAID6 or implementing a journaling solution of sparse volumes used in storage stacks.

Figure 6:
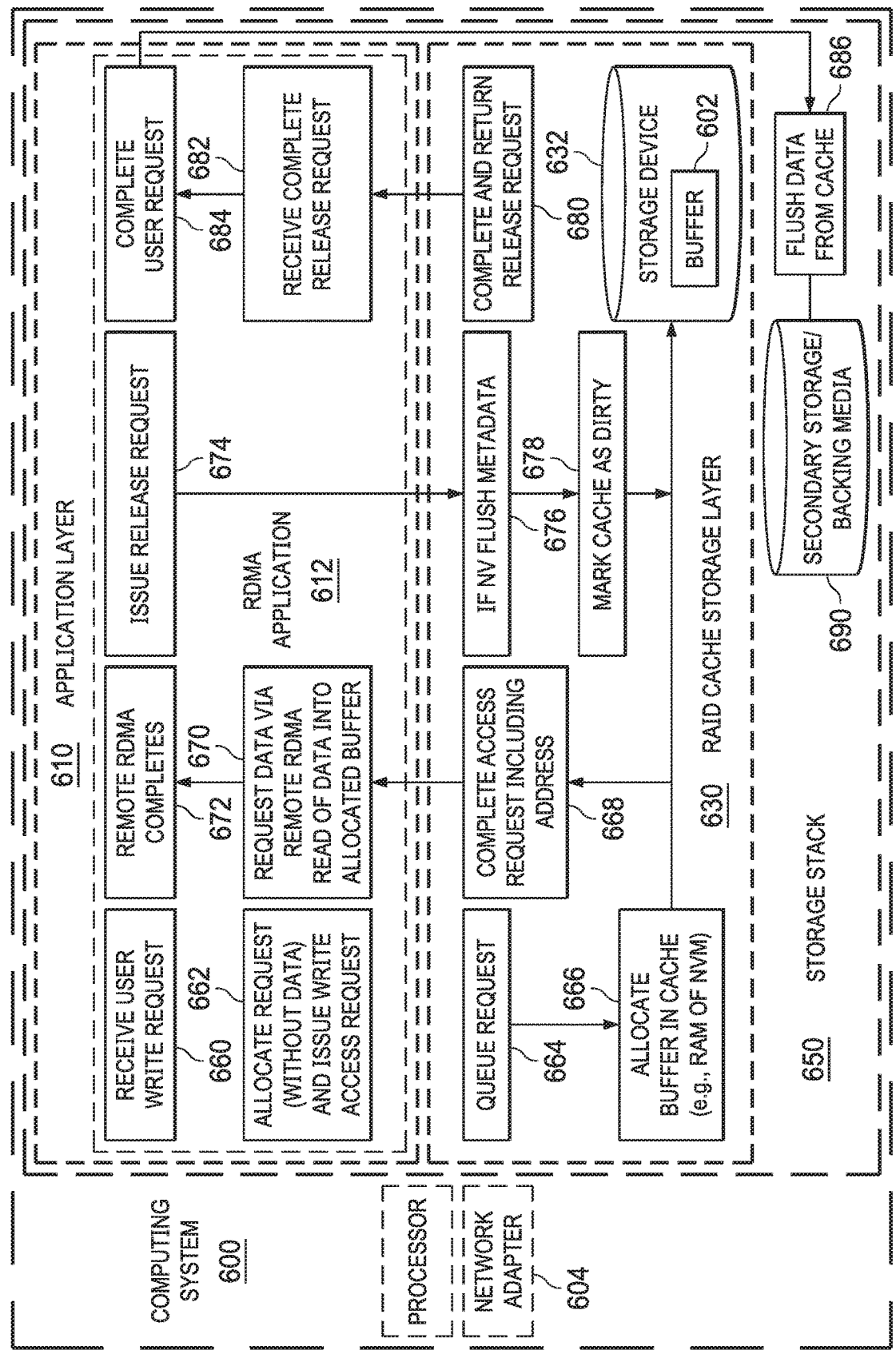
FIG. 6 is a block diagram of one embodiment of a computing system employing an embodiment of a storage stack to implement a cache for use with RDMA.

It may now be useful to illustrate the useful application of embodiments of access semantics as disclosed in various contexts. Looking then at FIG. 6, one embodiment of a computing system employing an embodiment of a storage stack to implement a cache for use with RDMA is depicted. Here, computing system 600 employs a storage stack 650 that allocates buffer space in a storage device 632 at a storage layer 630. Specifically, the storage stack 650 includes an application layer 610 that includes an RDMA application 612 that receives user write (or read) requests that have been received over a network from a user (e.g., client) through network adapter 604 (e.g., an RDMA adapter). The storage stack 650 also includes a RAID cache storage layer 630 for accessing a storage device 332 such as memory mapped storage device like a NV-DIMM or RAM. This storage device 632 may serve as a (e.g., volatile) cache utilized by a RAID application.

RDMA application 612 executes in the application layer 610 and may issue storage requests. Specifically, in one embodiment, the RDMA application receives a network user request for writing data that has arrived on the network (e.g., RDMA) adapter 604 (step 660). This user request may not contain the bulk data to write, only the metadata regarding the location of the write. The RDMA application 612 can then allocate a command context for this transaction and write the metadata information as has been described previously (step 662). This request can then be issued to the lower levels (e.g., software objects) in the storage stack 650 by calling the write access method.

This write access request can then be received by the RAID cache storage layer 630 and the request queued for processing (step 664). It should be noted that this queuing and processing may thus be asynchronous behavior (e.g., from the activities of the RDMA application 612). The RAID cache storage layer 630 can then allocate a buffer 602 in the storage device 632 (e.g., cache) for the data based on the metadata (e.g., data address and length) of the write access request (step 666). This buffer 602 may be assigned to the cache based on data address and the address locked for a writing (e.g., only this write request operation may write to the buffer 602).

The RAID cache storage layer 630 may then complete the request to the RDMA layer 612 (step 668). The RDMA layer 612 can then issue a network request to the original client from which the user request was received over the RDMA network to remotely read the bulk data associated with the write request (step 670). This request may request a remote RDMA read of the data over the network into the allocated buffer 602 using the address returned by the RAID cache storage layer 630 in the write access request. Upon completion of all remote reads for this request (step 672), the RDMA layer 612 format the (write) release request and issue the write release request (e.g., to the lower objects in the storage stack 650) (step 674).

This write release request is received at the RAID cache storage layer 630. The RAID cache storage layer 630 writes and flush metadata tracking information to the non-volatile media if storage device 632 is a volatile storage device (step 676). This ensures that the data arrives in non-volatile media before the metadata. At this point, if power fails both metadata and data are valid. The RAID cache storage layer 630 can then mark the cache as dirty, but unlock the cache entry for other I/O operations to read or write (step 678). Following this, the RAID cache storage layer 630 may complete the write release (step 680).

When the RDMA application 612 receives the completed release request (step 682), the RDMA application 612 can complete the original user write operation over the network to the issuing client (step 684). Additionally, at some point in the RDMA application 612 (e.g., or storage layer 630) may flush the data to the underlying secondary storage or backing media 690, such as slower drives (step 686). This may be a relatively more expensive operation that requires read-modify-writes to the secondary storage or backing media 690. Once flushed, the metadata on any non-volatile media is invalidated, the entry may be removed from the cache, and any buffers may be freed.

Figure 7:
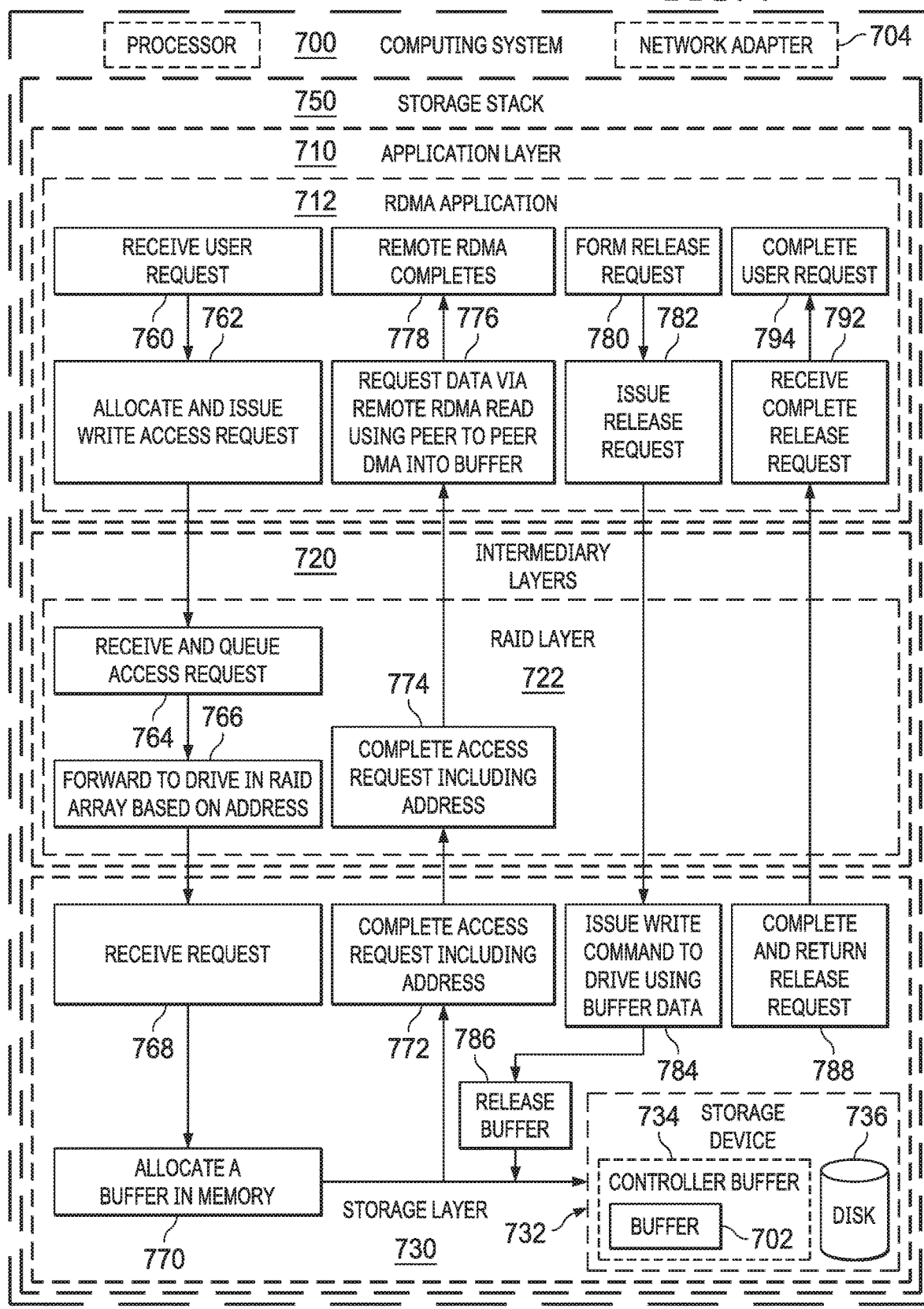
FIG. 7 is a block diagram of one embodiment of a computing system employing an embodiment of a storage stack to implement Peer to Peer DMA using a memory buffer.

Moving on to FIG. 7 a block diagram of one embodiment of a computing system employing an embodiment of a storage stack to implement Peer to Peer DMA using a memory buffer on the storage device, such as a controller memory buffer, is depicted. In this embodiment computing system 700 employs a storage stack 750 that allocates buffer space in a storage device 732 at a storage layer 730, where the storage device 732 may include a non-volatile memory 736 such as a disk drive or SSD. The storage device may be, for example, an NVME drive device that includes a controller (e.g., RAM) buffer 734. The storage stack 750 also includes an application layer 710 that includes an RDMA application 712 that receives user write (or read) requests that have been received over a network from a user (e.g., client) through network adapter 704 (e.g., an RDMA adapter or Network Interface Card (NIC)). The storage stack 750 also includes intermediary layers 720 including a RAID layer 722.

RDMA application 712 executes in the application layer 710 and may issue storage requests. Specifically, in one embodiment, the RDMA application 712 receives a network user request for writing data that has arrived on the network (e.g., RDMA) adapter 704 (step 760). This user request may not contain the bulk data to write, only the metadata regarding the location of the write. The RDMA application 712 can then allocate a command context for this transaction and write the metadata information as has been described previously (step 762). This request can then be issued to the lower levels (e.g., software objects) in the storage stack 750 by calling the write access method.

This write access request can then be received by the RAID layer 722 and the request queued for processing (step 764). It should be noted that this queuing and processing may thus be asynchronous behavior (e.g., from the activities of the RDMA application 712). The RAID layer 722 can then may modify or generate additional requests, if needed, and forward the access request (step 766). For example, the address of volume may be remapped to the correct underlying drive in a RAID set and forwarded to the correct hardware drive in the RAID array based on the data included in the received write access request (e.g., the address of the data as included in the write access request).

The storage layer 730 may receive the access request (step 768) and (e.g., the case of a write access request) access the storage device 732 to determine a memory address for a buffer 702 to satisfy the request (step 770). Specifically, in one embodiment, the storage layer 730 may allocate a buffer 702 for the bulk data to be received that is physically located in the controller memory buffer (e.g., RAM) 734 of the storage device 732.

The storage layer 730 may then complete the request, including the address of the buffer 702 in the write access request (step 772). The RAID layer 722, in turn, completes the write access request to the RDMA layer 712 (step 774). The RDMA layer 712 can then issue a network request to the original client from which the user request was received over the RDMA network to remotely read the bulk data associated with the write request (step 776). This request may request a remote RDMA read of the data over the network into the allocated buffer 702 using the address returned by the storage layer 730 in the write access request. Specifically, in one embodiment, the network request to the client over the RDMA network to remotely read the bulk data may cause the bulk data to be written to arrive from the remote client to the RDMA NIC (e.g., network adapter 704).

The RDMA NIC (e.g., network adapter 704) can then issue a peer-to-peer DMA to transfer this data directly to the NME drive (e.g., at the address of the buffer 702) bypassing the main memory of computer system 700.

Upon completion the remote RDMA transfer for this request (step 778), the RDMA layer 712 can format the (write) release request and issue the write release request (e.g., to the lower objects in the storage stack 750) (steps 780, 782). In one embodiment, this write release request, or the issuing of this request, may be optimized to skip the RAID layer 722 and go directly to the storage layer 730. At his point, the bulk data from the originally requesting client that was written (using peer-to-peer DMA from the network adapter 704 to the buffer 702) is available in the buffer 702 in the controller of the storage device 732. Thus, the storage layer 730 can issue a drive write request to the storage device 732 to write the data in the buffer 702 of the controller buffer 734 to the non-volatile storage media 736 (step 784). This command and subsequent write does not require any additional transfer of the bulk data (such as over the bus (e.g., PCIe bus)) of the computer system 700 as the data is already located on the storage device 732. After this write completes, the bulk data transferred from the client into the buffer 702 is not secure in the non-volatile media 736 of the storage device 732. At this point, the buffer 702 can be freed (step 786) and the write release request completed and returned (step 788). When the RDMA application 712 receives the completed release request (step 792), the RDMA application 712 can complete the original user write operation over the network to the issuing client (step 794).

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by a CPU or other processor or capable of being compiled or interpreted to be executable by the CPU or other processor. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein, including C, C++, Java, JavaScript, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain or store a program for use by or in connection with the instruction execution system, apparatus, system or device. The computer readable medium can be, by way of example only but not by limitation, an electronic, magnetic, optical, electromagnetic, or semiconductor system, apparatus, system, device or computer memory. Such computer-readable medium shall generally be machine readable and include software programming or code. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the foregoing specification, the invention has been described with reference to specific embodiments. However, one of ordinary skill in the art appreciates that various modifications and changes can be made without departing from the scope of the invention. Accordingly, the specification, including the Appendices and figures, are to be regarded in an illustrative rather than a restrictive sense, and all such modifications are intended to be included within the scope of the invention.

What is claimed is:

1. A system, comprising:
   a computer device, including:
   a processor:
   a storage device; and
   a storage stack, comprising:
      an application layer including an application executing on the processor;
      a storage layer for accessing the storage device;
      wherein,
      the application forms an access request by allocating space for the access request and including a sector address and length in the access request;
      the application issues the access request to the storage layer;
      the storage layer receives the access request and, based on the access request, including the sector address and length of the access request, determines an address of a buffer in the storage device;
      the storage layer completes the access request by including the address of the buffer in the storage device in the access request and returning the access request to the application;
      the application writes data directly to, or reads data directly from, the buffer in the storage device using the address of the buffer in the storage device that was included with the returned access request;
      the application forms and issues a release request to the storage layer including the address of the buffer;
      the storage layer receives the release request and releases the buffer;
      the storage layer completes the release request by nulling the address of the buffer in the release request and returns the completed release request to the application;
      responsive to the storage layer receiving the release request from the application, the storage layer frees the space allocated for the access request; and
      the application receives a complete release request from the storage layer.

2. The system of claim 1, wherein the storage device is a NV-DIMM and determining the address of the buffer comprises determining an NV-DIMM address associated with the sector address.

3. The system of claim 2, wherein completing the release request by the storage layer comprises flushing a cache when the access request is a write access request.

4. The system of claim 1, wherein the storage device is a RAM cache and determining the address of the buffer comprises determining a RAM address in the RAM cache associated with the sector address if the sector address is cached and otherwise allocating the buffer in the RAM cache, issuing a read request to an underlying disk drive, and incrementing a reference count on the buffer.

5. The system of claim 4, wherein completing the release request comprises decrementing the reference count on the buffer in the RAM cache and freeing the buffer if the reference count is zero.

6. The system of claim 1, wherein the storage device is a disk drive and determining the address of the buffer comprises allocating the buffer, issuing a read request to the disk drive and, upon completion of the read request, including the address of the buffer in the access request.

7. The system of claim 6, wherein completing the release request comprises freeing the allocated buffer in the disk drive.

8. A method, comprising:
   at a computer device, including a processor, a storage device, and a storage stack comprising an application layer including an application executing on the processor and a storage layer for accessing the storage device:
      the application forming an access request by allocating space for the access request and including a sector address and length in the access request;
      the application issuing the access request to the storage layer;
      the storage layer receiving the access request and, based on the access request, including the sector address and length of the access request, determining an address of a buffer in the storage device;
      the storage layer completing the access request by including the address of the buffer in the storage device in the access request and returning the access request to the application;
      the application writing data directly to, or reading data directly from, the buffer in the storage device using the address of the buffer in the storage device that was included with the returned access request;
      the application forming and issuing a release request to the storage layer including the address of the buffer;
      the storage layer receiving the release request and releasing the buffer;

the storage layer completing the release request by nulling the address of the buffer in the release request and returning the completed release request to the application;

responsive to the storage layer receiving the release request from the application, the storage layer freeing the space allocated for the access request; and the application receives a complete release request from the storage layer.

9. The method of claim 8, wherein the storage device is a NV-DIMM and determining the address of the buffer comprises determining an NV-DIMM address associated with the sector address.

10. The method of claim 9, wherein completing the release request by the storage layer comprises flushing a cache when the access request is a write access request.

11. The method of claim 8, wherein the storage device is a RAM cache and determining the address of the buffer comprises determining a RAM address in the RAM cache associated with the sector address if the sector address is cached and otherwise allocating the buffer in the RAM cache, issuing a read request to an underlying disk drive, and incrementing a reference count on the buffer.

12. The method of claim 11, wherein completing the release request comprises decrementing the reference count on the buffer in the RAM cache and freeing the buffer if the reference count is zero.

13. The method of claim 8, wherein the storage device is a disk drive and determining the address of the buffer comprises allocating the buffer, issuing a read request to the disk drive and, upon completion of the read request, including the address of the buffer in the access request.

14. The method of claim 13, wherein completing the release request comprises freeing the allocated buffer in the disk drive.

15. A non-transitory computer readable media, comprising instructions for:
at a computer device, including a processor, a storage device, and a storage stack comprising an application layer including an application executing on the processor and a storage layer for accessing the storage device:
the application forming an access request by allocating space for the access request and including a sector address and length in the access request;
the application issuing the access request to the storage layer;
the storage layer receiving the access request and, based on the access request; including the sector address and length of the access request, determining an address of a buffer in the storage device;
the storage layer completing the access request by including the address of the buffer in the storage device in the access request and returning the access request to the application;
the application writing data directly to, or reading data directly from, the buffer in the storage device using the address of the buffer in the storage device that was included with the returned access request;
the application forming and issuing a release request to the storage layer including the address of the buffer;
the storage layer receiving the release request and releasing the buffer;
the storage layer completing the release request by nulling the address of the buffer in the release request and returning the completed release request to the application;
responsive to the storage layer receiving the release request from the application, the storage layer freeing the space allocated for the access request; and
the application receiving a complete release request from the storage layer.

16. The non-transitory computer readable media of claim 15, wherein the storage device is a NV-DIMM and determining the address of the buffer comprises determining an NV-DIMM address associated with the sector address.

17. The non-transitory computer readable media of claim 16, wherein completing the release request by the storage layer comprises flushing a cache when the access request is a write access request.

18. The non-transitory computer readable media of claim 15, wherein the storage device is a RAM cache and determining the address of the buffer comprises determining a RAM address in the RAM cache associated with the sector address if the sector address is cached and otherwise allocating the buffer in the RAM cache, issuing a read request to an underlying disk drive, and incrementing a reference count on the buffer.

19. The non-transitory computer readable media of claim 18, wherein completing the release request comprises decrementing the reference count on the buffer in the RAM cache and freeing the buffer if the reference count is zero.

20. The non-transitory computer readable media of claim 15, wherein the storage device is a disk drive and determining the address of the buffer comprises allocating the buffer, issuing a read request to the disk drive and, upon completion of the read request, including the address of the buffer in the access request.

21. The non-transitory computer readable media of claim 20, wherein completing the release request comprises freeing the allocated buffer in the disk drive.

\* \* \* \* \*